United States Patent [19]

Rekers et al.

[11] Patent Number: 5,122,273
[45] Date of Patent: Jun. 16, 1992

[54] HYDROPHILIC MEMBRANE, PROCESS FOR PRODUCING A HYDROPHILIC MEMBRANE

[75] Inventors: Casper J. N. Rekers, Hardenberg; Gerrit J. Snijders, Gorredijk; Arie Zwijnenburg, Oldekerk; Dirk C. Weyenberg, Drachten, all of Netherlands

[73] Assignee: Stork Friesland B. V., Netherlands

[21] Appl. No.: 652,585

[22] Filed: Feb. 8, 1991

[30] Foreign Application Priority Data

Feb. 12, 1990 [NL] Netherlands ............... 9000329

[51] Int. Cl.$^5$ .............................................. B01D 39/00
[52] U.S. Cl. ........................ 210/500.27; 210/500.41; 264/41; 521/50
[58] Field of Search ............ 210/500.27, 653, 654, 210/500.23, 500.42, 500.21, 640, 651, 321.75, 500.41; 424/85.1; 252/174.21; 264/1.1, 2.2, 41; 521/50

[56] References Cited

U.S. PATENT DOCUMENTS

| 4,203,848 | 5/1980 | Grandine ...................... 210/500.42 |
| 4,798,847 | 1/1989 | Roesink et al. ............... 210/500.23 |
| 4,818,427 | 4/1989 | Alternoschoepfer et al. ................................. 252/174.21 |
| 4,906,375 | 3/1990 | Heilmann ..................... 210/500.27 |
| 4,968,430 | 11/1990 | Hilderbrand et al. ............ 210/640 |

FOREIGN PATENT DOCUMENTS

| 082433 | 6/1983 | European Pat. Off. . |
| 228072 | 7/1987 | European Pat. Off. . |
| 305787 | 3/1989 | European Pat. Off. . |
| 2368289 | 5/1978 | France . |
| 0008652 | 10/1977 | Japan ............... 210/500.27 |
| 8104496 | 5/1983 | Netherlands . |

*Primary Examiner*—Robert A. Dawson
*Assistant Examiner*—Ana Fortuna
*Attorney, Agent, or Firm*—Michael N. Meller

[57] ABSTRACT

A membrane for membrane filtration is disclosed, comprising a polymer matrix formed by coagulation with a liquid coagulant from a casting syrup, which polymer matrix is linked to hydrophilic groups belonging to a compound which has a hydrophilic chain section, is not coagulated by the liquid coagulant, is coupled on either side to a hydrophobic chain, is anchored in the polymer matrix by non-chemical bonding, and is composed of a compound which has a molecular weight of at least 2000 and can be used as a thickening agent.

7 Claims, No Drawings

HYDROPHILIC MEMBRANE, PROCESS FOR PRODUCING A HYDROPHILIC MEMBRANE

BACKGROUND OF THE INVENTION

The invention relates to a membrane for membrane filtration, comprising a polymer matrix formed by coagulation with a liquid coagulant from a casting syrup, which polymer matrix is linked to hydrophilic groups belonging to a compound which has a hydrophilic chain section and is not coagulated by the liquid coagulant and which is coupled on either side to a hydrophobic chain, which compound is anchored in the polymer matrix by nonchemical bonding.

DISCLOSURE OF THE PRIOR ART

Such a membrane is known from the Japanese patent specification 53.090367.

This known membrane contains hydrophilic groups composed of a polyethylene glycol chain. This chain is coupled on either side to, for example, an alkyl chain. The molecular weight of this known compound which provides hydrophilic groups is, however, low. In addition, only a matrix formed from cellulose ester is described as membrane matrix Such membranes are, however, themselves already hydrophilic to some extent.

This known membrane matrix is, however, inherently already less susceptible to contamination. The drawback of using such a membrane consists in the limited chemical resistance of the membrane.

SUMMARY OF THE INVENTION

A membrane which does not have this drawback and, in addition, has good chemical resistance when more hydrophobic polymers are used, has now been found.

The membrane according to the invention is characterised in that the compound not being coagulated by the liquid coagulant is composed of a compound which has a molecular weight of at least 2000 and can be used as a thickening agent.

Preferably, the central section of the compound which can be used as thickening agent is composed of an optionally modified polyglycol.

Such a membrane enables a very high product flux as a result of the hydrophilic groups present. Surprisingly, it has also been found that this type of compounds also causes the number of pores to increase considerably. The hydrophobic chains linked to the central section of the compound which can be used as thickening agent are inserted in the polymer matrix during the coagulation in the liquid coagulant in a manner such that said groups are firmly anchored in said matrix.

More particularly, the compound which can be used as thickening agent is composed of non-ionogenic polyalkylene glycol or dialkyl polyglycol ether. Compounds which have been found to be particularly expedient are those compounds which are commercially available through the AKZO company under the trademark DAPRAL GT 282 and DAPRAL T 210 and T 212.

It is pointed out that Polymer Bulletin 4, pages 617-622, 1981 discloses a membrane which is formed by coagulation of a casting syrup composed of a mixture of hydrophobic polymerisate and polyethylene glycol. The membranes obtained after coagulation do not, however, have the hydrophilic properties to a sufficient extent because the hydrophilic compounds present are eluted from the coagulated membrane during coagulation by the aqueous liquid which is used for the flocculation.

Dutch Patent application 86.02402 furthermore discloses hydrophilic membranes which are produced by coagulating a mixture of a hydrophilic polymer and a hydrophobic polymer, dissolved in a suitable solvent, in a coagulating medium and, after the coagulation, chemically cross-linking the hydrophilic polymer present in or on the membrane matrix by a treatment and fixing it in position in or on the polymer matrix.

The compound used according to the invention and containing hydrophilic groups is not, however, anchored in the polymer matrix by chemical bonding, but purely by physical bonding, while the chemical linking treatment used for the abovementioned known membrane is absent.

However, if one or more reactive groups are present, preferably in the hydrophobic chains, an additional linking treatment is possible if desired.

Finally, U.S. Pat. No. 4,203,848 discloses a hydrophobic membrane which is rendered hydrophilic using a surface-active agent which is essentially insoluble in water and is composed of a hydrophobic chain section which is coupled on either side to a hydrophilic chain. Said membrane is rendered hydrophilic by means of a posttreatment (coating). The disadvantage of this is that the coating is anchored non-chemically or physically and is eluted after the passage of time.

It is pointed out that the hydrophilic membrane according to the invention is particularly suitable for microfiltration and/or ultrafiltration purposes, for example in the filtration of milk and dairy products and the filtration of foodstuffs.

Obviously, the use of the hydrophilic membrane obtained by the addition is not limited to these fields.

Suitable polymers for the polymer matrices may be chosen from polyvinyl chloride, polyamide, modacryl, cellulose acetate, polypropylene, polyvinylidene fluoride, polytetrafluoroethylene, polyacrylonitril, polyether imide, polyphenylene oxide, polysuphone, polyether sulphone, etc.

The additions now found have, moreover, the important property that they are resistant to a large number of chemicals.

For the purification of protein containing substrates, very good results are obtained with a polymer matrix which is formed on the basis of polyacrylonitril or polysulphone.

The solvent used for forming the casting syrup is preferably dimethylformamide or N-methylpyrrolidone, although other suitable solvents may be used, such as dimethyl sulphoxide, dimethylacetamide, etc.

The invention relates, furthermore, to a process for producing a hydrophilic membrane by forming a casting syrup of a suitable membrane-forming polymer, mixing the casting syrup with a compound which contains hydrophilic groups and is composed of a hydrophilic chain which is coupled on either side to a hydrophobic chain, forming a layer and then subjecting said layer to coagulation with a liquid coagulant to form a polymer matrix as membrane, in which process a section of the hydrophilic chain containing compound is anchored in the polymer matrix by non-chemical bonding.

It has been found that the use of such a compound which can be used as a thickening agent, in the casting syrup results, on the one hand, in a beneficial change in the viscosity of the casting syrup and, on the other hand, makes possible a firm anchoring in the polymer matrix because of the relatively high molecular weight, as a result of which elution is prevented.

Preferably an optionally modified polyglycol is used for the compound, which can be used as thickening agent.

Such a compound assures the formation of a hydrophilic membrane which has a large number of hydrophilic groups.

The addition acts, moreover, as a pore former, as a result of which the porosity of the membranes so obtained is increased.

Both effects promote the permeability to water and reduce the susceptibility of the surface to contamination.

Expediently, a non-ionogenic polyalkylene glycol or a dialkyl polyglycol ether is used as the compound which can be used as thickening agent.

To obtain a hydrophilic membrane according to the invention, a casting syrup is formed which preferably contains up to 250 g/l of a compound which can be used as thickening agent.

The quantity to be used may therefore be varied to a wide extent, it being possible to produce a hydrophilic membrane which has clean water flux which is 5 to 6 times greater than is obtained with one of the same membranes but without the hydrophilic groups, even if small quantities of the compound which can be used as a thickening agent are used.

There is, of course, no limitation at all with regard to the form in which the membrane is provided. Depending on the use, it will possible to choose, for example, a flat membrane, a membrane in the form of hollow fibres, or tubular membranes.

The invention is explained in greater detail below in a few examples which do not serve, however, to restrict the inventive idea.

The invention also comprises the use of a compound, to be used as thickening agent, as membranemodifying agent which generates hydrophylic groups in a process for producing a hydrophilic membrane according to the invention.

DESCRIPTION OF THE PREFERRED EMBODIMENTS

Example I

Flat membranes have been prepared from two different casting syrups according to the invention: composition of syrup A: 24% polysulphone +5% DAPRAL (trademark of AKZO) in DMF, composition of syrup B: 24% polysulphone in DMF state of the art.

After determining the clean water flux (CWF) of both membranes in an Amicon test cell, filtration was carried out with a β-lactoglobulin solution (initial concentration 0.1%) in citric acid/phosphate buffer (pH=4.7).

Table A gives a summary of the results obtained:

| membrane | CWF before test (1/m$^2$h · bar) | mean flux during test | CWF after test (1/m$^2$h · bar) |
|---|---|---|---|
| A | 45.3 | 20.6 | 17.7 |
| B | 22.6 | 3.9 | 3.6 |

It appears clear that the flux decrease of the hydrophilic membrane A as a result of protein contamination is appreciably less after ultrafiltration of a protein solution than with the standard membrane B.

Example II

In a test, standard (prior art) tubular polyacrylonitril membranes and tubular hydrophilic polysulphone membranes prepared from syrup A of example 1 (according to the invention) have been compared in a batch test for the separation of an oil emulsion.

With a cf=17, the polyacrylonitril membranes where found to have a product flux of 5 1/m$^2$h.bar, while the hydrophilic polysulphone membranes had a product flux of 20 1/m$^2$h.bar.

At the end of the test it was found during inspection, in addition, that the surface of the hydrophilic polysulphone membranes was appreciably less contaminated.

Example III

In a test on 10× diluted skimmed milk and centrifuged whey, the output of a polysulphone membrane prepared from a casting syrup having a composition of 24% polysulphone in 76% DMF (according to the prior art) has been compared with a hydrophilic membrane prepared from a casting syrup having a composition of 25% polysulphone +5% DAPRAL in NMP (according to the invention).

The fluxes found (in 1/m$^2$h.bar) for the test with skimmed milk are reported in table B:

| membrane | CWF before test | product flux for cf = 1 | product flux for cf = 9 | CWF after cleaning |
|---|---|---|---|---|
| Standard | 35.4 | 11.4 | 9.9 | 26.2 |
| Hydrophilic | 139.8 | 27.1 | 24.7 | 134.5 |

Table C gives the results for the test on whey:

| membrane | CWF before test | product flux for cf = 1 | product flux for cf = 5 | CWF after cleaning |
|---|---|---|---|---|
| Standard | 31.9 | 9.2 | 7.9 | 29.1 |
| Hydrophilic | 154.6 | 25.7 | 28.9 | 156.3 |

From both tests it is evident that the hydrophilic membranes according to the invention had much higher product fluxes and were easy to clean after use.

Example IV

In the abovementioned examples, the effect of the addition is based both on making the membrane matrix more hydrophilic and on increasing the porosity of the obtained ultrafiltration membranes.

Adding the groups of substances mentioned to the casting syrup also appears to result in a considerable increase in (product) flux in the formation of microporous membranes.

Thus, although a flat PVDF membrane prepared by coagulating a film spread from a casting syrup containing 18% PVDF in DMF in a bath composed of 75% DMF/25% H$_2$O gives a beautiful microporous cross section, it gives no flux at 1 bar.

Addition of 7.5% DAPRAL, under otherwise identical circumstances, gives a microporous structure having pores and a CWF of approximately 825 1/m$^2$h.bar.

What is claimed is:

1. A hydrophilic filtration membrane formed from a casting syrup by coagulation in a coagulant liquid, said casting syrup comprising a suitable solvent, a first coagulatable hydrophobic polymer and a second compound not coagulatable by the liquid coagulant, said second compound having a central hydrophilic chain section which is coupled on either side of said hydrophilic chain section to a hydrophobic chain sections, wherein said second compound has a molecular weight of at least 2000 and wherein upon coagulation of a film of the casting syrup, the hydrophobic chain sections of said second non-coagulatable compound are anchored in the hydrophobic polymer matrix of the first polymer, forming at the internal and external surfaces of the membrane thus formed a layer of said hydrophilic groups.

2. Membrane according to claim 1, wherein the central section of said non-coagulatable compound is composed of a modified polyglycol.

3. Membrane according to claim 1, wherein said non-coagulatable compound is composed of a non-ionogenic polyalkylene glycol or dialkyl polyglycol ether.

4. Process for producing a hydrophilic membrane by forming a casting syrup of a suitable solvent and a first coagulatable membrane-forming hydrophobic polymer, mixing the casting syrup with a second non-coagulatable compound consisting of a central hydrophilic chain which is coupled on either side to a hydrophobic chain, forming a layer of said casting syrup and then subjecting said layer to coagulation with a liquid coagulant to form a polymer matrix as membrane, in which process the hydrophobic ends of t he hydrophilic chain containing compound are anchored in the polymer matrix by non-chemical bonding, wherein the said central hydrophilic chain containing non-coagulatable compound used has a molecular weight of at least 2000 and the resulting hydrophilic membrane formed has a layer of hydrophilic groups at the internal and external surfaces of the membrane.

5. Process according to claim 4, wherein a modified polyglycol is used as said non-coagulatable compound.

6. Process according to claim 4, wherein a non-ionogenic polyalkylene glycol or dialkyl polyglycol ether is used as said non-coagulatable compound.

7. Process according to claim 4, wherein a casting syrup is formed which contains up to 250 g/l of said non-coagulatable compound.

* * * * *